United States Patent [19]

Rubin et al.

[11] Patent Number: 5,006,281
[45] Date of Patent: Apr. 9, 1991

[54] PROCESS FOR THE PRODUCTION OF A MARINE ANIMAL OIL

[75] Inventors: David Rubin, Jerusalem, Israel; Elyiahu J. Rubin, San Diego, Calif.

[73] Assignee: Century Laboratories, Inc., Port Washington, N.Y.

[21] Appl. No.: 9,028

[22] Filed: Jan. 28, 1987

Related U.S. Application Data

[63] Continuation of Ser. No. 716,502, Mar. 26, 1985, abandoned.

[51] Int. Cl.$^5$ .............................................. C11B 31/04
[52] U.S. Cl. ................................. 260/424; 260/412; 260/412.1; 260/412.7; 424/522; 424/523; 424/554; 424/555
[58] Field of Search ............... 426/601, 608, 417, 478, 426/73, 311; 260/398, 398.5, 404, 406, 404.5, 412, 412.1, 412.7, 424; 424/522, 523, 554, 555

[56] References Cited

U.S. PATENT DOCUMENTS

| | | | |
|---|---|---|---|
| 2,134,163 | 10/1938 | Wentworth | 260/412.1 |
| 2,136,481 | 11/1938 | Young et al. | 260/412.1 |
| 3,157,517 | 11/1964 | Tholstrup et al. | 426/546 |
| 3,519,662 | 7/1970 | Gruver, Jr. et al. | 260/412.7 |
| 3,573,936 | 4/1971 | Karchmar et al. | 426/546 |
| 3,590,056 | 6/1971 | Tholstrup et al. | 260/399 |
| 3,628,971 | 12/1971 | Karchmar | 426/545 |
| 3,664,851 | 5/1972 | Feenstra et al. | 426/546 |
| 3,784,480 | 1/1974 | Karchmar et al. | 252/404 |
| 3,947,602 | 3/1976 | Clewell, Jr. et al. | 426/417 |
| 4,097,602 | 6/1978 | Silver et al. | 424/305 |
| 4,101,673 | 7/1978 | Chang | 424/312 |
| 4,240,972 | 12/1980 | Mag et al. | 260/424 |
| 4,526,902 | 7/1985 | Rubin | 514/560 |
| 4,554,107 | 11/1985 | Takao | 260/421 |

FOREIGN PATENT DOCUMENTS

| | | | |
|---|---|---|---|
| 452315 | 11/1948 | Canada | 260/412 |
| 56-160974 | 12/1981 | Japan . | |
| 449246 | 6/1936 | United Kingdom | 260/412.1 |
| 1120754 | 7/1968 | United Kingdom | 260/412.1 |
| 2033745 | 5/1980 | United Kingdom . | |
| 1604554 | 12/1981 | United Kingdom . | |

OTHER PUBLICATIONS

Schultz, H. W. et al., "Lipids and Their Oxidation," The Avi Publ. Co. Inc., Westport, CN, 1962, pp. 178-179.

Shiraishi, et al., "Masking of Off-odor in Foods with Fermented Seasoning," 1982 Chem Abstract 97:108677t.

Lee et al., "A Study on the Suppressing Effects of Spices for Fishy Odor—the Effect of Vinegar and Ginger," 1979 CA 91:191562w.

Araki, Kunio—"Deodorizing Process."—Sep. 18, 1974—Chem Abstract—82:102701q.

Teraski, Keiko—"Suppresive Effect of Condiments on Fishy Odor"—1981—Chem Abstract 96:5061n.

Akamatsu et al.—"Antioxidation Effects of Dialkyl Thiodipropionates."—1969—Chem Abstract 70:69889j.

Matsumoto et al.—"Stabilization of Fat and Oil from Fish." Sep. 1971—Chem Abstract 75:1632619.

Fukuyama, et al.—"Removal of Malodorous Amine--Containing Gas."—1980—Chem Abstract 94:89545t.

Terasaki, Keiko Miso—"Suppressing Effect of Condiments on Fishy Odor."—1978—Chem Abstract 91:156314v.

*Primary Examiner*—Douglas W. Robinson
*Assistant Examiner*—Jean C. Witz
*Attorney, Agent, or Firm*—Browdy and Neimark

[57] ABSTRACT

Marine animal oil free of undesirable odor or taste is produced by treating a freshly killed marine animal with a peroxidase-inhibiting antioxidant, disaggregating the marine animal, separating the oil phase, mixing with a dilute aqueous acidic solution, removing the oil phase and adding antioxidant. Marine animal oil which has already turned rancid may be restored to a non-rancid state by mixing with a reducing antioxidant such as a thiodipropionate, separating out the fatty acids which have reacted with the antioxidant, preferably by column chromatography, and adding another antioxidant to prevent further peroxidation.

27 Claims, No Drawings

PROCESS FOR THE PRODUCTION OF A MARINE ANIMAL OIL

This application is a continuation of application Ser. No. 716,502, filed Mar. 26, 1985, now abandoned.

FIELD OF THE INVENTION

The present invention relates to marine animal oil free of any repulsive odor or taste, and, more particularly, to such an oil which can be used in foods, such as cooking oil, mayonnaise, salad dressings, etc., and a method for the production thereof from fresh marine animals. The present invention further relates to a process for refining existing rancid marine animal oil (or any other rancid polyunsaturated fat or oil) in order to remove the rancidity therefrom.

BACKGROUND OF THE INVENTION

It is known that Greenland Eskimos rarely suffer from atherosclerotic cardiovascular diseases. This fact has been attributed to the consumption of high amounts of marine animal oil. The active ingredient in fish oil is (all-Z)-5,8,11,14,17-eicosapentaenoic acid (hereinafter EPA). Most marine oils also contain docosahexaenoic acid (DHA). EPA and DHA are known to be precursors in the biosynthesis of prostaglandin $E_3$ ($PGE_3$) and thus provide at least come protection against cardiovascular diseases (see U.S. Pat. No. 4,097,602 and British patents 1,604,554 and 2,033,745).

Despite the fact that marine animal oil and the components thereof are known to be very healthful, people of the modern Western world very rarely consume marine animal oil, such as cod liver oil. Undoubtedly, one of the main reasons why there is not a greater consumption of marine animal oil, such as cod liver oil or other fish oils, is the particularly distasteful odor and taste which can best be described as repulsive. If marine animal oil could be deodorized and improved in taste, and particularly if other undesirable components could be removed therefrom, it is anticipated that the dietary uses of marine animal oil as an inexpensive source of highly polyunsaturated fat would increase greatly, and a corresponding improvement in public health would follow inevitably therefrom.

The poor flavor of raw, untreated marine animal oil is due to the presence of methylamines, i.e., trimethylamine, dimethylamine and oxides thereof, naturally present in fish, as well as peroxides and epoxides resulting from decomposition of the oil. The decomposition of marine animal oil occurs to a noticeable degree almost immediately after the slaughter of the fish. The addition of traditional antioxidants to the processed oil therefore does not rid the oil of its rancid odor and flavor.

Edible oils are typically deodorized by steam treatment and/or distillation. However, the necessary heating can deteriorate the oil. Furthermore, these conventional treatments do not remove trimethylamine or peroxides.

Past efforts have yielded various methods of masking trimethylamine odors. In one method (*Chemical Abstracts* 96:5061n), the fish odor is masked by cooking wine, cooking sake, mirin or synthetic sake, in decreasing order of effectiveness. The water-soluble organic acid components and amino acids of sakashio, a fermented seasoning typically used for masking the odor of trimethylamine, are known to mask trimethylamine odor, depending upon the pH of the solution in which they are present and the degree of buffering action they offer (*Chemical Abstracts* 97:108677t). Soy sauce exhibits a similar masking and buffering effect (*Chemical Abstracts* 91:156314v). Vinegar has also been used to suppress trimethylamine odor in fish and has been found to decrease the trimethylamine concentration in fish as the vinegar concentration is increased (*Chemical Abstracts* 91:191562w). A combination of an organic acid and a perfume has also been used to counteract trimethylamine odors (Japanese Kokai 56-160974).

Unfortunately, the odor of trimethylamine is only masked and not obviated by the above agents. These masking agents also add flavors to the fish, which, although they may not be disagreeable, are certainly undesirable if an odorless, tasteless product which may be further processed and used, for example as a cooking oil, is desired. Furthermore, these masking agents do not remove peroxides. Peroxides not only cause taste degradation, but are also mutagenic and possibly even carcinogenic.

Processes are known for removing trimethylamine from fish processing plant waste gas using activated sludge (*Chemical Abstracts* 94:89545t) or by passage through a zeolite tuff layer (*Chemical Abstracts* 82:102701g). The process conditions clearly render such processes unsuitable for treating oil for human consumption. Moreover, such processes are applicable to purification of gases rather than oils. Again, there is no reason to believe that such a process is applicable for the removal of peroxides.

Japanese patent 71-30195 discloses a process for removing peroxides from fish oils by the addition of metal oxides, such as $Al_2O_3$, ZnO, $SiO_2$ gel, and NiO, and subsequently reacting the oil with steam at 150–220° C. and 5–6 mm Hg for 50–70 min. This process has several drawbacks. The necessity of reacting the oil with steam requires the consumption of a large amount of energy and the heat treatment over such a substantial period of time will ultimately degrade the oil and cause polymerization. The necessary use of vacuum further increases energy consumption.

In the U.S. Pat. No. 3,664,851, the deterioration of fatty acids is counteracted and slightly reversed to some extent by the addition of a compound of the structure RCH=CHCH=CH—Z where R is an alkyl group and Z is a polar group. This compound, however, has a flavor of its own and, if used as a counteractant in a highly deteriorated oil, must be added to the oil as a precursor which forms the compound at an appropriate rate to reverse deterioration without affecting the flavor.

It has been suggested in the prior art to prevent the deterioration of oil by the addition of a thiodipropionic acid or dialkyl thiodipropionate, such as dilauryl thiodipropionate (see, for example, *Chemical Abstracts* 70:69889; and U.S. Pat. Nos. 3,590,056; 3,573,936; 3,628,971; and 3,784,480). Usually, the dialkyl thiodipropionate is used in conjunction with a second antioxidant. The dialkyl thiodipropionate acts as a scavenger to prevent further oxidation of the oil. Unfortunately, dialkyl thiodipropionates have a highly objectionable odor due to release of sulfhydryl groups. Moreover, dialkyl thiodipropionates have only been used to prevent the deterioration of oils and have not been used to remove products of oil deterioration.

The use of antioxidants, and particularly the mixture of γ-tocopherol and ascorbic acid, to preserve oils is also known (U.S. Pat. No. 4,101,673). However, as mentioned above, serious deterioration of marine animal oil usually occurs before antioxidants may be added. Thus, it is clear that the mere addition of antioxidant to oils according to known methods is insufficient for the production of an odorless oil from highly unstable marine animal oils.

SUMMARY OF THE INVENTION

Accordingly, it is an object of the present invention to resolve the problems of the prior art discussed above.

It is a further object of the present invention to provide a marine animal oil substantially free of repulsive odor and taste.

It is another object of the present invention to provide a storage stable marine animal oil substantially free of peroxides and substantially free of trimethylamine.

It is yet another object of the present invention to provide a marine animal oil product consisting essentially of polyunsaturated fatty acids.

It is still another object of the present invention to provide foodstuffs containing storage-stable marine animal oil substantially free of peroxides and trimethylamines.

It is yet another object of the present invention to provide a process of refining rancid polyunsaturated oil products in order to remove the rancidity and produce a product which smells and tastes substantially fresh.

It is a further object of the present invention to provide a process of refining rancid marine animal oil in order to remove peroxidation products and trimethylamines therefrom thereby producing an oil which smells and tastes substantially fresh.

These and other objects of the present invention are obtained by the selective extraction of those components of the marine animal or other oil which cause the rancidity and/or repulsive odor or taste, and by adding components to prevent further production of such components.

A storage-stable marine animal oil of clear golden hue having no smell whatsoever other than the natural smell of mineral oil is preferably obtained by immediately spraying antioxidant onto freshly killed fish, separating the oil from the meat, and then removing trimethylamine from the oil by mixing with an aqueous acidic solution to cause the trimethylamine to dissolve in the aqueous phase, and then separating the oil phase from the aqueous phase. Additional antioxidants may then also be added.

If the oil to be purified has already become rancid, it is treated in order to remove the hydroperoxides and epoxides which cause the rancid odor and taste by mixing with thiodipropionic acid or an ester thereof, such as dilauryl thiodipropionate, and then passing the mixture through a column of preactivated silica gel. The thiodipropionate binds to the hydroperoxide or epoxide groups and is retained on the silica gel column. The fractions which are collected thus contain the purified oil. Further antioxidant is immediately added in order to avoid degradation of the oil after removal of the peroxides and epoxides. The organic solvent is then evaporated, preferably under reduced pressure in a nitrogen atmosphere.

If the rancid oil being refined is a marine animal oil, the trimethylamine should also be removed in the manner discussed with respect to fresh marine animal oil.

DETAILED DESCRIPTION OF PREFERRED EMBODIMENTS

In one embodiment of the present invention in which fresh stabilized and deodorized marine animal oil is obtained, it is important that the treatment begin as soon as possible after the marine animal is killed. The lysozomes of the cells of live marine animals naturally contain peroxidase enzyme which can cause the unsaturations of the marine animal oil to become peroxidized. As soon as the lysozome membrane is ruptured, which takes place immediately after death, this enzyme begins to attack the marine animal oil causing peroxidation which, in turn, causes the repulsive odor and taste which we know as rancidity and which are known to be hazardous mutagens. Certain antioxidants are known to be capable of inhibiting peroxidase enzymes. If such antioxidants are applied to the fish meat immediately upon the death of the fish, and certainly within a few minutes of death, the peroxidase enzymes will be inhibited, and the rancidity forming hydroperoxides and epoxides will not form. All antioxidants prevent non-enzymatic autoxidation.

While the oil of any marine animal may be treated in accordance with the present invention, the preferred marine animals are those having naturally occurring antioxidants which better control the peroxidase enzyme in the living animal. Thus, preferred fish include salmon, tuna and red shark. On the other hand, in fish such as swordfish and cod, there is some peroxidation of the fish oil in the living animal, and this is why even very fresh oil obtained from such fish has some amount of rancidity. Such fish can still be used in accordance with a second embodiment of the present invention in which not only is the trimethylamine removed, but also the hydroperoxides and epoxides.

If a marine animal is used which does not have natural peroxidation, removal of methylamines from the fish oil will yield an oil free of unpleasant odor and taste. Treatment with antioxidants will prevent further peroxidation and thus provide the product with an excellent shelf-life.

To obtain the best results, the living fish are killed at a temperature of 0-4° C. and the internal organs are removed. The meat is then cut into slices and antioxidants are sprayed immediately all over the slices.

It is important that the antioxidant or antioxidant combination used at this stage of the process be capable of inhibiting peroxidase enzymes as well as protecting against autoxidation. It should also preferably be substantially free of smell or taste. Antioxidants known to be capable of inhibiting peroxidase enzymes include the tocopherols, propyl gallate, nordihydroguaiaretic acid, gallic acid, and eicosatetraenoic acid ($\omega 3$). The preferred antioxidant is a combination of a $\gamma$-tocopherol antioxidant, preferably $\gamma$-tocopherol, together with a metal scavenging agent such as ascorbyl palmitate. These two compounds are known to act synergistically in order to provide an excellent antioxidant effect against autoxidation. The $\gamma$-tocopherol is an inhibitor of peroxidase and neither $\gamma$-tocopherol nor ascorbyl palmitate have any taste or smell. Thus, this is an excellent combination for all phases of the present invention, whenever antioxidant is needed.

Depending upon the marine animal whose oil is being recovered, other organs of the animal may be used rather than the meat. For example, in the red shark the liver is used because almost 90% of the weight of the red shark liver is oil. The proportional amount of oil in the muscle of the red shark is much less. Whichever part of the marine animal is used, the antioxidant should be sprayed thereon immediately after removal from the fish. Such removal should take place as soon as possible after the death of the fish. It is also possible for the antioxidant to be sprayed on the living fish, or for the living fish to be placed in water containing antioxidant, or for the living fish to be injected with antioxidant.

The antioxidant sprayed slices, whether muscle, liver or other components, are disaggregated in a mixer for about 1-2 minutes. The disaggregated mixture is then transferred to a centrifugal separation apparatus in order to filter out the solids and to separate the oil phase from the aqueous phase. For example, the use of a centrifuge rotating at 7,000-10,000 rpm for 10-15 minutes will cause good separation of the oil phase. Commercial continuous centrifuges may also be used, such as the apparatus used for skimming milk. The particular type of centrifuge is not critical and can be readily selected by one of ordinary skill in the art. It is useful not only to separate out the oil but also to recover the solids, as the solid portion comprises a nutritious fish meal, totally free of fat and oil, which can be used to prepare various food products for humans and other animals The oil which has been separated is then treated in order to remove the methylamines therefrom. It has been discovered that if the methylamines are removed from fresh fish oil in which no rancidity has yet set in, all fishy odor and taste is removed from the oil. This discovery is contrary to the common theory that the fishy smell of fish oil is caused by the molecular structure of the oil itself. It has been discovered that the methylamines (including trimethylamine, dimethylamine and oxides thereof) can be easily removed by mixing the oil with an acidic aqueous solution. The solution should be sufficiently dilute to avoid any hydrolysis of the triglycerides in the oil. As long as the aqueous solution has a pH below 7, the methylamines will form a salt which will dissolve in the aqueous phase.

Preferably, the oil is mixed in a 1:1 ratio with the acidic aqueous phase but, of course, substantially more or less water can be used and still accomplish separation of the methylamines. The oil phase is then separated by any conventional means such as a separating funnel or a centrifugal separator. The acid treatment step is preferably repeated several times in order to ensure that all methylamines are removed from the oil. The treatment is then repeated using only distilled water to remove all acid from the product.

The result is a clear golden oil having only the neutral taste and smell of mineral oil, which has practically no taste or smell. It is impossible to detect that the source of the oil is a marine animal.

Antioxidants are added to the purified oil in an amount which provides for maximum protection. The preferred antioxidant is a mixture of a γ-tocopherol and ascorbyl palmitate. The amount of γ-tocopherol which is added to the purified oil is generally from about 0.0020-0.200 wt.% based on the oil, with a range of 0.0020-0.100% being preferred, and a range from about 0.0050-0.05 wt.% being most preferred.

A metal scavenging agent, e.g., ascorbyl palmitate, citric acid, or the like, is employed in conjunction with the tocopherol. The amount of scavenging agent employed is limited by its solubility in the oil. For citric acid, the amount employed typically is about 0.01 wt.% based on the oil. For ascorbyl palmitate about 30 mg/100 g oil is the limit of its solubility. In general, it is preferred that the scavenging agent employed be present in an amount of at least 0.01 wt.% based on the oil.

While ascorbyl palmitate is the preferred metal scavenging agent, other metal scavengers may also be utilized, e.g., citric acid, Rosemary Extract, BHT (butylated hydroxytoluene), BHA (butylated hydroxyanisol) and the like.

The entire operation discussed above may be conveniently carried out directly on board the fishing vessel.

While the product obtained by the above described process may be used directly, for example as a substitute for cod liver oil, the oil obtained by this process will still contain substantial amounts of vitamins A and D, and in some instances may contain certain unsaponifiable matter, such as sterols and polymers and possibly even some amount of polychlorinated biphenyls (PCB), depending on the source of the oil. In fact, the amount of vitamins in the oil may limit the quantity of oil which may be taken in any given dosage period, as excess consumption of marine animal oil may lead to vitamin A or D toxicity. Similarly, the presence of cholesterol in the oil is contrary to the desired physiological effects of the highly polyunsaturated oil. Furthermore, since autoxidation is an autocatalytic process, it is reasonable to further remove all non-oil constituents in order to eliminate whatever catalyzes the reaction. This will further protect against autoxidation, notwithstanding the presence of antioxidants. Any possible presence of PCB's is particularly undesirable as these are known health hazards.

These products may be removed, along with any other possibly undesirable components present, such as peroxides, pigments, thermal oxidative decomposition products, etc., by treating the oil with silicic acid or silica gel. This procedure may be done in the manner described in the Chang U.S. Pat. No. 4,101,673 with respect to soybean and sunflower oils, or in the manner discussed hereinbelow for removing peroxides from already rancid oil.

Once a marine animal oil has become rancid, different problems are faced in removing the repulsive odor and taste. Unless the fish meat and the oil are treated with antioxidants immediately upon the death of the fish, some amount of peroxidation or epoxidation of the unsaturated bonds of the fish oil will take place, either enzymatically or via autoxidation with the air. U.S. Pat. No. 4,101,673 to Chang discloses that peroxides may be removed from soybean oil and sunflower oil by simply passing the oil through a column of activated silicic acid or silica gel. While this simple procedure may be effective for sunflower oil and soybean oil, it is not particularly effective for removing the rancidity from marine animal oils. This is no doubt true because the predominant fatty acid in sunflower oil and soybean oil is cis-linoleic acid which has only two unsaturations. The predominant fatty acids in marine animal oil are EPA and DHA having 5 and 6 unsaturations, respectively. Thus, there are many more unsaturations subject to peroxidation or epoxidation thereby causing a much greater problem of rancidity and a much more distinctive smell and taste than is obtained when peroxides are formed in cis-linoleic acid. Thus, insufficient peroxides are removed by the method of Chang and therefore his method is unsatisfactory to eliminate the rancid taste and odor of rancid marine animal oil.

Japanese patent 71/30195 to Taiyo Fishery Company Limited suggests removing hydroperoxides and epoxides from marine animal fats and oils by adding metal oxides, e.g. $Al_2O_3$, ZnO, $SiO_2$ gel, NiO, etc., and reacting with steam at 150–220° C. and 5–6 mm Hg for 50–70 minutes. As indicated above, this is also a particularly undesirable process because of the severe reaction conditions which can cause degradation and polymerization of the oil.

By means of the present invention, the rancid marine animal oil, i.e. marine animal oil which already has a substantial formation of peroxides and epoxides, is contacted with a secondary antioxidant, i.e. an antioxidant which is known to be capable of reducing an already formed peroxide or epoxide group. While any such secondary antioxidant may be used in the present invention, the only one presently approved for use in food products in the U.S.A. is dilauryl thiodipropionate. The thiodipropionate moiety reacts with the peroxide or epoxide group so as to resolve the oxygen therefrom, and to create a new molecule without toxicity. Because of the attachment of the thiodipropionate molecule, the new molecule will have a much different structure than the non-epoxidized marine animal oil and can therefore be removed by conventional separation techniques, such as column chromatography.

In one method of removing the peroxides and epoxides, dilauryl thiodipropionate is added to the rancid smelling marine animal oil. The amount of dilauryl thiodipropionate added depends on the degree of rancidity of the oil. It may be freely added in excess, however, as any excess dilauryl thiodipropionate will react with the silica in the column and be removed from the oil. Theoretically, the amount to be added should be stoichiometric with the amount of peroxidation or epoxidation in the oil. If less than this amount is added, then some degree of rancidity will still be detectable from the recovered oil and the procedure can be repeated.

Because of the substantial difference in molecular weight and size of the molecule after the reaction with dilauryl thiodipropionate, most standard types of separation techniques may be used. A preferred example is the use of a column of pre-activated silica gel or silicic acid. The oil may be passed through the column by either applying vacuum at the bottom or pressure at the top or both. The temperature of the column is preferably maintained at room temperature or less throughout the procedure in order to avoid any undesired reactions, such as polymerization. However, if desired, the column may be wrapped with an electric heating tape to increase its temperature to about 60–80° C. which has the effect of significantly increasing the flow rate of the oil through the column.

The oil can be passed through the column alone or in the form of a solution in a solvent, such as hexane or another suitable alkane solvent having 5–18 carbon atoms. Mixtures of such alkanes may also be used, e.g., petroleum ether. Where a solution of marine animal oil in an alkane solvent is utilized rather than the oil alone, the ratio by volume of solvent to oil is generally from about 10:1 to 0.1:1, a more preferable range being 4:1 to 0.2:1. Because the solvent, however, must be avoided in the final product, it is preferred that the oil alone be passed through the column, thereby avoiding a subsequent separation operation.

It is important that antioxidant be added immediately to the oil from which the peroxides and epoxides have been separated in order to avoid further autoxidation after separation. Preferably, the antioxidant is already in the flask which collects the fractions from the column. Because it is extremely unlikely that any peroxidase enzymes are still present in the oil at this time, which is long after the death of the marine animal, it is no longer crucial to use an antioxidant which is also peroxidase inhibitor. Any antioxidant which provides good protection against autoxidation may be used. However, due to their outstanding synergistic properties, the preferred antioxidant is still a combination of γ-tocopherol and ascorbyl palmitate.

While dilauryl thiodipropionate is used as the preferred compound for reaction with the peroxide and epoxide groups, it should be understood that it is the sulfur atom that combines with the epoxide or the peroxide group, and therefore the length of the acid arms or the ester chains is not critical. While thiodipropionic acid itself can be used, it has a very low lipid solubility and therefore the ester is preferred, particularly a fatty acid ester such as the dilauryl ester. However, any alkyl ester can be used. The polyesters of U.S. Pat. No. 3,157,517 and 3,590,056 can also be used.

Other methods of separation can also be used such as, for example, centrifugation. In this case, an even longer chain ester of thiodipropionic acid may be used in order to increase the molecular weight difference between the products.

Chromatography is the preferred technique. When the oil or a solution thereof has passed through a chromatography column, not only will the peroxides and epoxides be removed but other impurities in the oil, which include pigments, unsaponifiables, polymers, PBC's and thermal and oxidative decomposition products will be absorbed on the column, as well as any excess thiodipropionate.

The products which have been purified in this manner could also be further refined in the manner discussed above in order to remove any trimethylamine components of the oil which are not removed in the chromatography column. Once the peroxides and the trimethylamines have been removed, a substantially fresh-smelling oil will be regenerated.

In order to improve the nutritional value of the product obtained by either of the embodiments of the present invention, the further removal of the fully saturated fatty acids can be accomplished in order to leave an oil consisting substantially entirely of polyunsaturated fatty acids. Fully saturated fatty acids are known to increase the level of low density lipoproteins which are involved in the cholesterol formation pathway and are known to increase the serum cholesterol levels. The important nutritional value of marine animal oil lies in the polyunsaturates, and particularly the EPA and DHA content which are known to decrease cholesterol levels (see British patents 1,604,554 and 2,033,745, U.S. Pat. No. 4,097,602 and U.S. application Ser. No. 545,349, filed Oct. 24, 1983).

The fully saturated fatty acids may be removed from the purified oil by lowering the temperature of the oil to +4° C. At this temperature, the fully saturated fatty acids solidify, and the remaining oil may be decanted in order to leave a product extremely high in beneficial highly polyunsaturated fatty acids.

The purified products of the present invention are useful for the same purposes as have long been well known for marine animal oil, such as cod liver oil. Furthermore, the oils which have been treated with the thiodipropionates and passed through a silica gel column will also be substantially free of vitamins A and D.

This is particularly beneficial because the administration of a sufficient amount of fish oil to provide advantageous amounts of polyunsaturated fatty acids would ordinarily provide toxic amounts of these vitamins.

The purified oils obtained in accordance with the present invention may also be used in food products in the same manner as other polyunsaturated oils have been so used, such as corn oil, sunflower oil, safflower oil, etc. The oil of the present invention used in cooking oil or salad oil is even more beneficial than the use of vegetable oils because of the high content of the highly polyunsaturated fatty acids such as EPA and DHA. It has been established that such highly polyunsaturated fatty acids produce high density lipoproteins and are thus more beneficial in avoiding cholesterol formation and cholesterol deposition in the arteries than the less highly polyunsaturated fatty acids. Such marine animal oils have not been used in the past for such purposes because of their noxious smell and taste, and high content of vitamins A and D. These problems are now alleviated by means of the present invention.

The following examples are not meant to be limitative but merely to illustrate embodiments of the present invention.

EXAMPLE 1

Living salmon are killed at a temperature of 0-4° C. The internal organs are removed and the meat is cut into slices. A 1:1 mixture of γ-tocopherol and ascorbyl palmitate is sprayed immediately all over the slices.

The antioxidant sprayed slices are then mixed in a blender for 1-2 minutes and the blended mixture transferred to a centrifuge operating at 7,000-10,000 rpm for 10-15 minutes. After centrifugation, the oil phase is separated and mixed in a 1:1 ratio with a 1% aqueous solution of hydrochloric acid. After mixing well, the phases are allowed to separate and the oily phase is removed by means of a separating funnel. The step of mixing with dilute hydrochloric acid is repeated several times in order to remove all methylamines and then the oil is washed with distilled water and separated therefrom several times in order to remove any remaining acid.

Additional antioxidants in amounts of 0.02% of γ-tocopherol and 0.02% of ascorbyl palmitate by weight of the oil are then added.

Oil prepared in this manner kept in an open pan for 30 days does not acquire any rancid taste. Analytical studies show less than 2 meq peroxides after 30 days at 22° C.

EXAMPLE 2

To 100 g of off-the-shelf cod liver oil, having a distinctively fishy smell, is added 20 mg of dilauryl thiodipropionate. A silica column is activated by heating to 450° C. with the addition of 5% silver nitrate. The silica is wrapped with aluminum foil to avoid blackening and is then cooled to room temperature.

The mixture of cod liver oil and dilauryl thiodipropionate is poured through the preactivated silica column and chromatography is carried out by adding organic solvents. First, 100% hexane is passed through and then ethyl ether.

The chromatographic fractions are collected in a flask containing 20 mg of γ-tocopherol and 20 mg of ascorbyl palmitate. The organic solvents are evaporated under reduced pressure in a nitrogen atmosphere.

The obtained oil is then treated in the manner described in example 1, beginning with the step of mixing with dilute hydrochloric acid.

The obtained product is free of the distinctive smell of cod liver oil.

EXAMPLE 3

The product obtained in Example 1 is cooled to 4° C. and kept at this temperature until a portion of the oil solidifies. The remaining liquid is then decanted from the solidified portion. The solidified portion is shown to be composed substantially entirely of fully saturated fatty acid. This product is then passed through an activated silica column as described above in example 2 in order to remove any additional impurities as well as the vitamins A and D present therein. The obtained product is substantially pure highly polyunsaturated fatty acids.

It will be obvious to those skilled in the art that various changes may be made without departing from the scope of the invention and the invention is not be be considered limited to what is described in the specification.

What is claimed is:

1. A process for the production of storage-stable marine animal oil free of undesirable odor or taste wherein the marine animal is one in which substantially no peroxidation of the oil thereof occurs naturally in the living animal comprising:
   treating that portion of a freshly killed marine animal from which the oil is to be obtained with a first antioxidant having peroxidase inhibiting capacity;
   dissagregating said antioxidant treated portion to obtain an oil phase, an aqueous phase and a solid phase;
   removing the oil phase from the aqueous phase and the solid phase;
   mixing said oil phase with an aqueous acidic solution which is sufficiently dilute to avoid hydrolysis of triglycerides in the oil, in a manner effective to cause methylamines to dissolve in the aqueous phase which forms upon such mixing;
   removing the oil phase from the aqueous phase which forms during said mixing step; and
   adding a further antioxidant to the obtained oil phase.

2. A process in accordance with claim 1, wherein the portion of the marine animal from which the oil is obtained is the muscle thereof.

3. A process in accordance with claim 1, wherein the portion of the marine animal from which the oil is obtained is the liver thereof.

4. A process in accordance with claim 1, wherein said marine animal is tuna, salmon or red shark.

5. A process in accordance with claim 1, wherein each of said first and said further antioxidant is a combination of γ-tocopherol and ascorbyl palmitate.

6. A process in accordance with claim 1, wherein said steps of mixing and subsequently removing are repeated until substantially all trimethylamine dimethylamine and oxides thereof are removed from the oil phase.

7. A process in accordance with claim 1, further including, after said steps of mixing with acidic solution and removing the oil phase, the steps of mixing the removed oil phase with water and removing the oil phase from the aqueous phase.

8. A process in accordance with claim 1, further including the step of removing vitamins A and D, cholesterol and other unsaponifiable materials from the obtained product by column chromatography.

9. A process in accordance with claim 1, further including the step of removing fully saturated fatty acids from the obtained product.

10. A process in accordance with claim 9, wherein said step of removing fully saturated fatty acids comprises cooling the obtained product to about 4° C. until a portion of the product solidifies, and recovering the remaining liquid oil.

11. A process for removing rancidity from marine animal oil containing substantial amounts of polyunsaturated fatty acids, comprising:
mixing the marine animal oil with a first antioxidant having peroxide or epoxide group reduction capacity in a manner effective to cause reduction by said first antioxidant of peroxide or epoxide groups formed at the unsaturations of the fatty acids of the marine animal oil;
separating the fatty acids having antioxidant-reduced groups from the non-oxidized fatty acids; and
adding a second antioxidant to the non-oxidized fatty acids no later than immediately following said separating step, wherein said second antioxidant is one which exerts its antioxidant effect by preventing autoxidation of polyunsaturated fatty acids.

12. A process in accordance with claim 11, wherein said first antioxidant is a thiodialkanoic acid or an ester or polyester thereof.

13. A process in accordance with claim 12, wherein said first antioxidant is thiodipropionic acid or an ester or polyester thereof.

14. A process in accordance with claim 13, wherein said first antioxidant is dilauryl thiodipropionate.

15. A process in accordance with claim 11, wherein said separating step is accomplished by column chromatography.

16. A process in accordance with claim 11, wherein said second antioxidant is a combination of γ-tocopherol and ascorbyl palmitate.

17. A process in accordance with claim 11, further including the steps of mixing the oil containing said non-oxidized fatty acids with an aqueous acidic solution which is sufficiently dilute to avoid hydrolysis of triglycerides in the oil, in a manner effective to cause methylamines to dissolve in the aqueous phase which forms upon such mixing;
and separating the oil phase from the aqueous phase.

18. A process in accordance with claim 11, further including the step of removing fully saturated fatty acids from the obtained product.

19. A process in accordance with claim 18, wherein said step of removing fully saturated fatty acids comprises cooling the obtained product to about 4° C. until a portion of the product solidifies, and recovering the remaining liquid oil.

20. A process for the production of storage-stable marine animal oil free of undesirable odor or taste wherein the marine animal is one in which peroxidation of the oil thereof occurs naturally in the living animal comprising:
treating that portion of a freshly killed marine animal from which the oil is to be obtained with a first antioxidant having peroxidase inhibiting capacity;
dissagregating said antioxidant treated portion to obtain an oil phase, an aqueous phase and a solid phase;
removing the oil phase from the aqueous phase and the solid phase;
mixing the removed oil phase with a second antioxidant, said second antioxidant being one which exerts its antioxidant effect on polyunsaturated fatty acids by reducing peroxide or epoxide groups formed at the unsaturations thereof, in a manner effective to cause reduction of peroxide or epoxide groups in the removed oil phase by said second antioxidant;
separating the fatty acids having antioxidant-reduced groups from the oil phase containing the non-oxidized fatty acids;
mixing said oil phase with an aqueous acidic solution which is sufficiently dilute to avoid hydrolysis of triglycerides in the oil, in a manner effective to cause methylamines to dissolve in the aqueous phase which forms upon such mixing;
removing the oil phase from the aqueous phase which forms during said mixing step; and
adding a further antioxidant to the obtained oil phase.

21. A process in accordance with claim 20, wherein said marine animal is swordfish or cod.

22. A process in accordance with claim 20, wherein said second antioxidant is a thiodialkanoic acid or an ester or polyester thereof.

23. A process in accordance with claim 22, wherein said second antioxidant is dilauryl thiodipropionate.

24. A process in accordance with claim 20, wherein said step of separating the fatty acids having antioxidant-reduced groups from the non-oxidized fatty acids, is accomplished by column chromatography.

25. A process in accordance with claim 20, wherein said steps of mixing with a second antioxidant and separating the fatty acids having antioxidant-reduced groups from the non-oxidized fatty acids occur prior to said step of mixing said oil with a dilute aqueous acidic solution.

26. A process in accordance with claim 20, wherein said steps of mixing with a third antioxidant and separating the fatty acids having antioxidant-reduced groups from the non-oxidized fatty acids occur after said steps of mixing with a dilute aqueous acetic solution and removing the oil phase from the aqueous phase.

27. A process in accordance with claim 26, wherein said step of adding a further antioxidant to the obtained oil phase comprises adding said further antioxidant to the non-oxidized fatty acids no later than immediately following said step of separating the fatty acids having antioxidant-reduced groups from the non-oxidized fatty acids.

* * * * *